United States Patent
Mangardich et al.

(10) Patent No.: US 12,270,310 B2
(45) Date of Patent: Apr. 8, 2025

(54) TEST ROTOR BLADE FOR AN AIRCRAFT ENGINE BLADE-OFF TEST

(71) Applicant: Pratt & Whitney Canada Corp., Longueuil (CA)

(72) Inventors: Dikran Mangardich, Richmond Hill (CA); Paul Stone, Guelph (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/238,315

(22) Filed: Aug. 25, 2023

(65) Prior Publication Data

US 2025/0067195 A1 Feb. 27, 2025

(51) Int. Cl.
  *F01D 21/00* (2006.01)
  *F01D 5/12* (2006.01)
  *G01M 15/14* (2006.01)

(52) U.S. Cl.
  CPC ............. *F01D 21/003* (2013.01); *F01D 5/12* (2013.01); *G01M 15/14* (2013.01); *F05D 2240/30* (2013.01)

(58) Field of Classification Search
  CPC ........ F01D 21/003; F01D 21/045; F01D 5/12; F04D 27/001; G01M 15/14; F05D 2260/83
  USPC .................................................. 415/9; 416/2
  See application file for complete search history.

(56) References Cited

U.S. PATENT DOCUMENTS

| | | |
|---|---|---|
| 7,841,834 B1 * | 11/2010 | Ryznic ................. F04D 29/023 416/224 |
| 10,113,442 B2 | 10/2018 | Hall |
| 10,260,512 B2 | 4/2019 | Hall |
| 10,774,679 B2 * | 9/2020 | Cotten .................... F01D 5/147 |
| 2011/0146519 A1 * | 6/2011 | Han ......................... F42B 1/02 86/1.1 |
| 2018/0016934 A1 * | 1/2018 | Hall ...................... F01D 21/045 |

FOREIGN PATENT DOCUMENTS

| | | |
|---|---|---|
| CN | 115127823 A | 9/2022 |
| FR | 3042536 B1 | 11/2017 |

OTHER PUBLICATIONS

Jack Sain, Advisory Circular Turbine Engine Rotor Blade Containment/Durability, Jun. 18, 1990, Federal Aviation Administration (Year: 1990).*

EP Search Report for EP Patent Application No. 24196276.0 dated Jan. 23, 2025.

* cited by examiner

*Primary Examiner* — Michael K. Reitz
(74) *Attorney, Agent, or Firm* — Getz Balich LLC

(57) ABSTRACT

A test rotor blade for an aircraft engine bladed rotor includes a blade body. The blade body extends between and to a leading edge and a trailing edge. The blade body forms a first side surface and a second side surface. The blade body forms a leading-edge pocket at the leading edge, a trailing-edge pocket at the trailing edge, and a hole extending through the blade body from the leading-edge pocket to the trailing edge pocket. The blade body includes a first side wall and a second side wall. The first side wall has a first wall thickness extending between and to the first side surface and the hole. The second side wall has a second wall thickness extending between and to the second side surface and the hole. The second wall thickness is 0.4 to 0.9 times the first wall thickness.

18 Claims, 8 Drawing Sheets

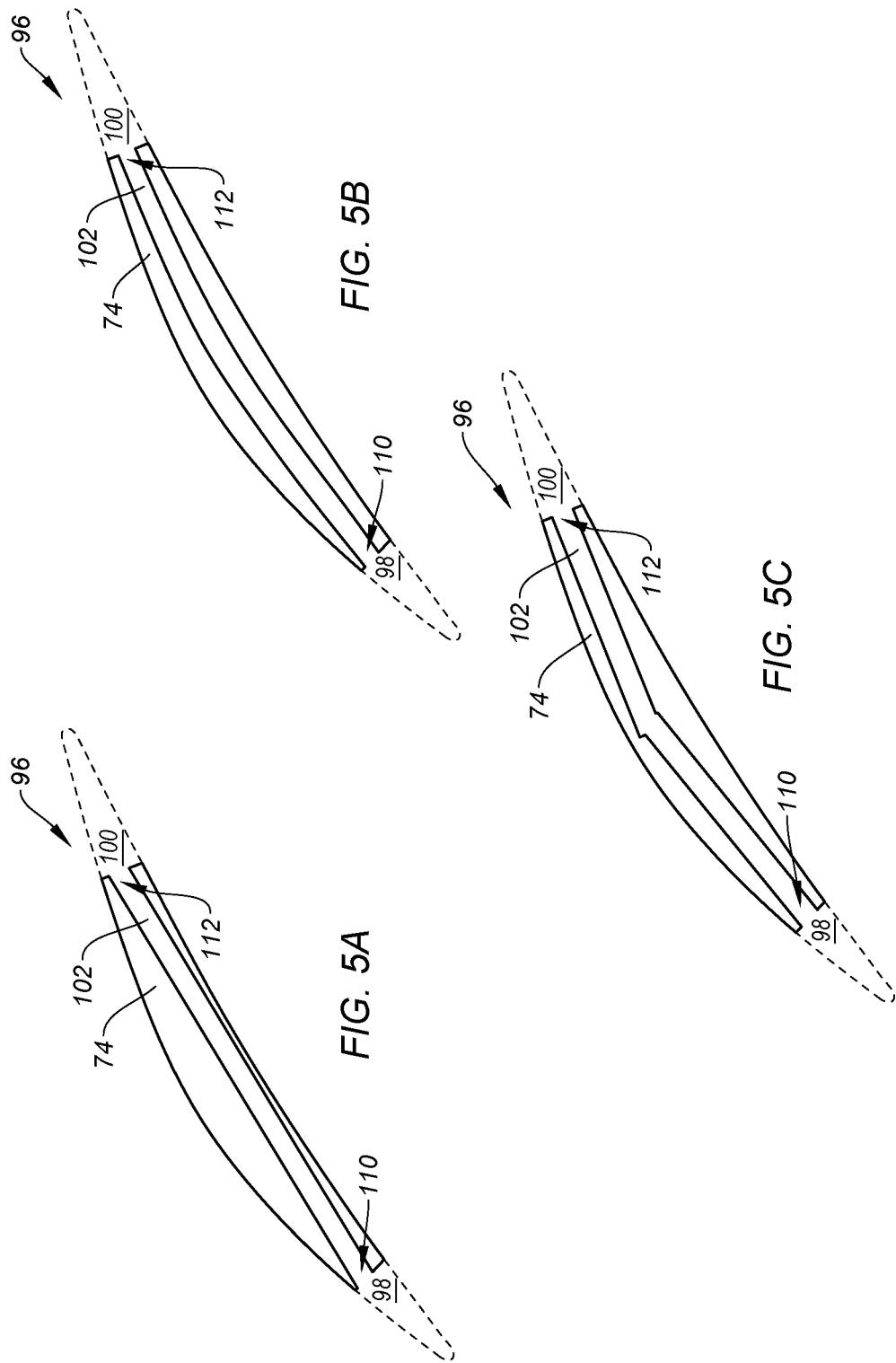

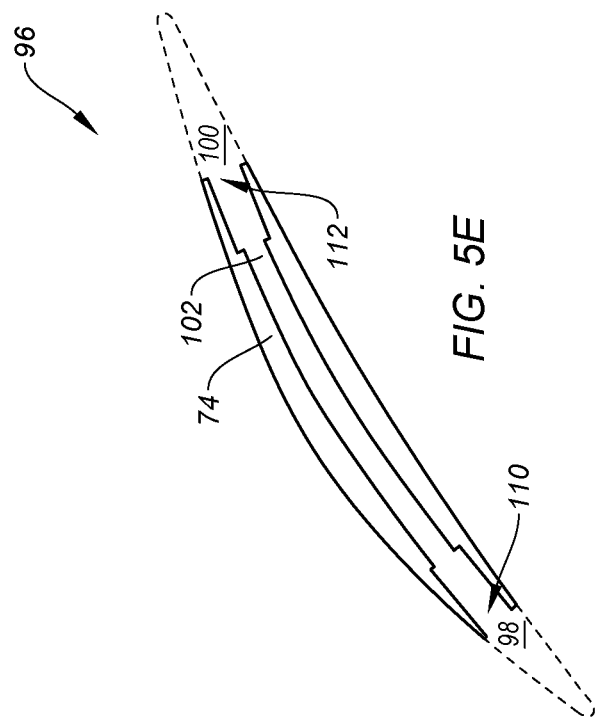
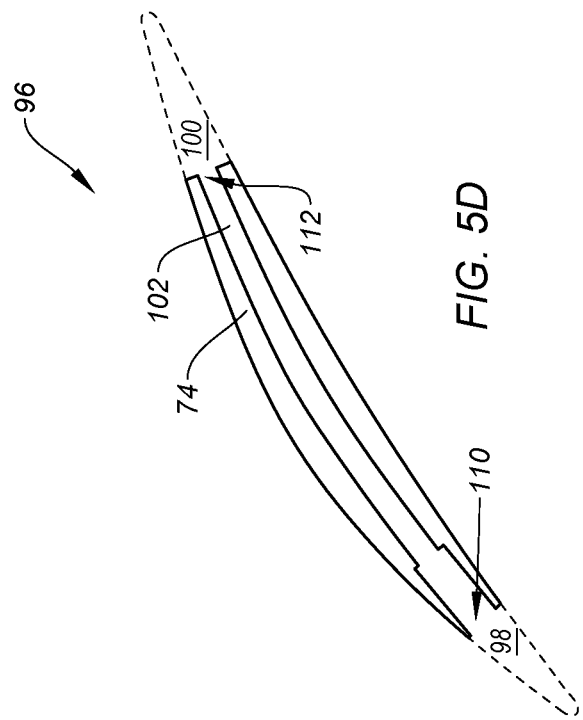

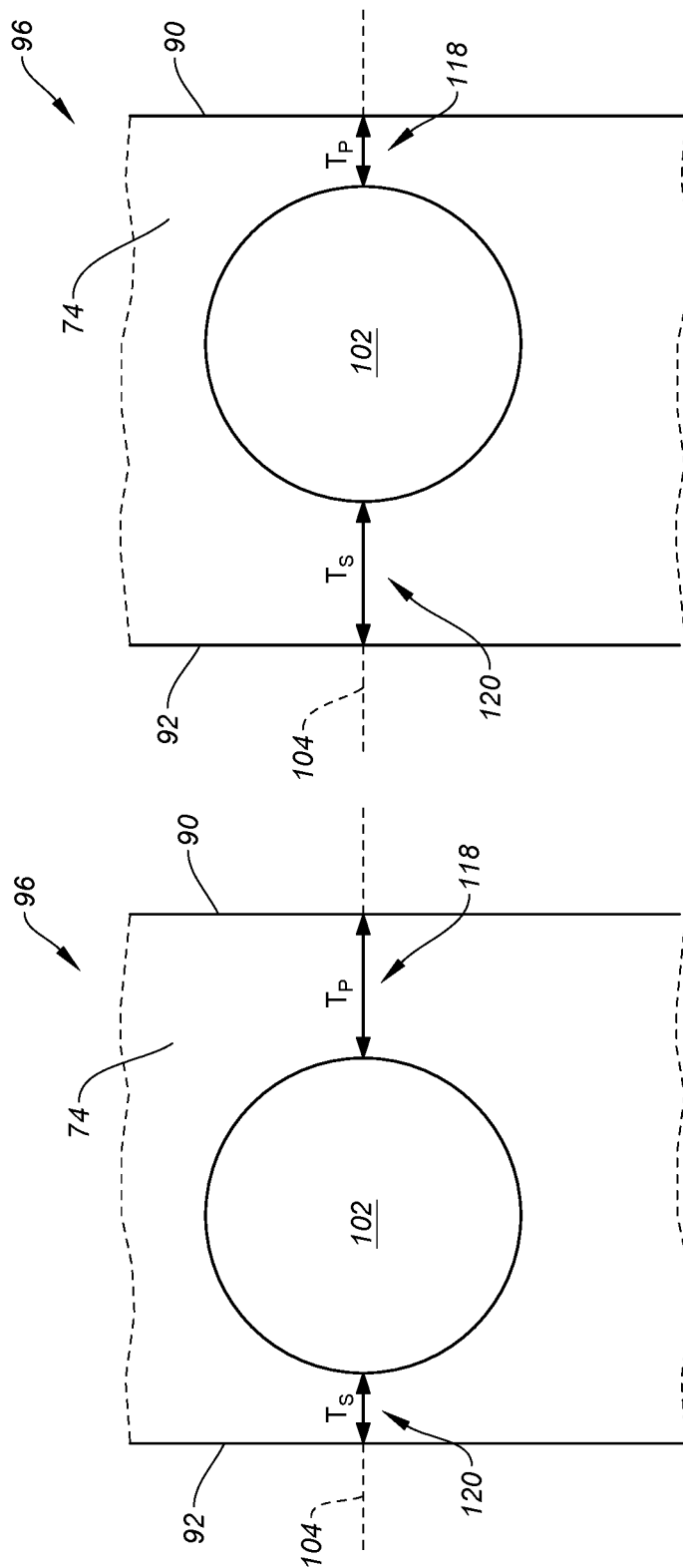

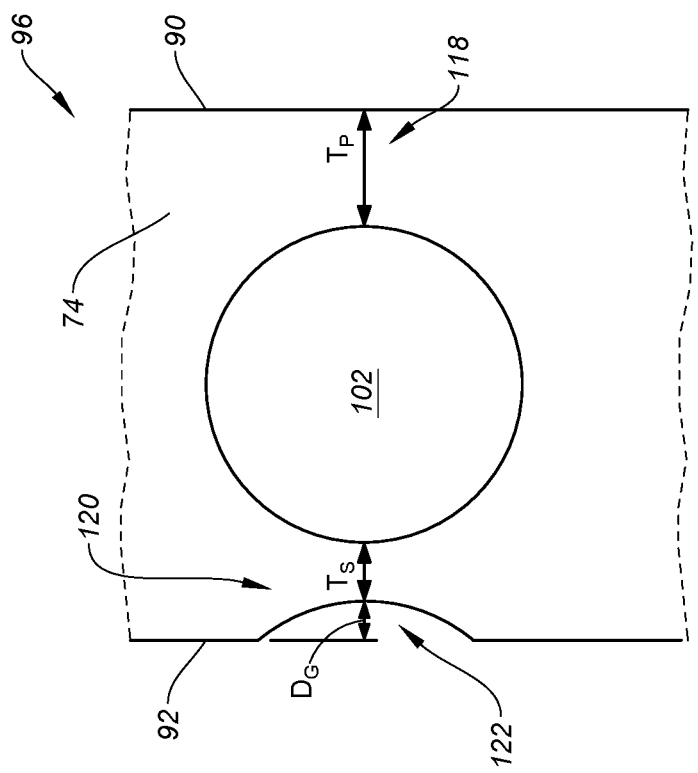

TEST ROTOR BLADE FOR AN AIRCRAFT ENGINE BLADE-OFF TEST

TECHNICAL FIELD

This disclosure relates generally to blade-off tests for aircraft engine rotors and, more particularly, to a test rotor blade configured for use in a blade-off test for an aircraft engine rotor.

BACKGROUND OF THE ART

A bladed rotor for an aircraft engine (e.g., a gas turbine engine) may include a plurality of rotor blades distributed about the bladed rotor. Aircraft engine testing may, in some cases, include the performance of a blade-off test for a bladed rotor. The blade-off test evaluates a response of the aircraft engine to a blade-off event in which at least a portion of a rotor blade separates from the bladed rotor during bladed rotor operation. The blade-off test may be performed using a test rotor blade configured to be selectively separated (e.g., fractured) to initiate a blade-off event. Various test rotor blade configurations and blade-off tests processes are known in the art While the known configurations and processes have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a test rotor blade for an aircraft engine bladed rotor includes a blade body. The blade body extends between and to a base end and a tip end. The blade body extends between and to a leading edge and a trailing edge. The blade body forms a first side surface and a second side surface. Each of the first side surface and the second side surface extend from the leading edge to the trailing edge. The blade body forms a leading-edge pocket at the leading edge, a trailing-edge pocket at the trailing edge, and a hole extending through the blade body from the leading-edge pocket to the trailing edge pocket. the hole includes a first end, a second end, and a hole length from the first end to the second end. The first end is disposed at the leading-edge pocket. The second end is disposed at the trailing-edge pocket. The blade body includes a first side wall and a second side wall. The first side wall has a first wall thickness extending between and to the first side surface and the hole. The second side wall has a second wall thickness extending between and to the second side surface and the hole. The second wall thickness is 0.4 to 0.9 times the first wall thickness.

In any of the aspects or embodiments described above and herein, the first side surface may be a pressure side surface of the blade body and the second side surface may be a suction side surface of the blade body.

In any of the aspects or embodiments described above and herein, the first side surface may be a suction side surface of the blade body and the second side surface may be a pressure side surface of the blade body.

In any of the aspects or embodiments described above and herein, the second wall thickness may be 0.4 to 0.9 times the first wall thickness for all of the hole length of the hole.

In any of the aspects or embodiments described above and herein, the first wall thickness may be a first average wall thickness extending between and to the first side surface and the hole along the hole length and the second wall thickness may be a second average wall thickness extending between and to the second side surface and the hole along the hole length.

In any of the aspects or embodiments described above and herein, the hole may extend linearly from the first end to the second end.

In any of the aspects or embodiments described above and herein, the hole may be curved between the first end and the second end.

In any of the aspects or embodiments described above and herein, the hole may form plurality of linear segments between the first end and the second end.

In any of the aspects or embodiments described above and herein, the blade body may form a groove on the second side surface at a location of the second wall thickness.

In any of the aspects or embodiments described above and herein, the test rotor blade may further include a thermite thermal charge disposed within the hole.

According to another aspect of the present disclosure, a gas turbine engine for an aircraft propulsion system includes a compressor. The compressor includes a bladed compressor rotor. The bladed compressor rotor includes a plurality of rotor blades. The plurality of rotor blades includes a test rotor blade. The test rotor blade includes a blade body. The blade body extends between and to a base end and a tip end. The blade body extends between and to a leading edge and a trailing edge. The blade body forms a pressure side surface and a suction side surface. Each of the pressure side surface and the suction side surface extends from the leading edge to the trailing edge. The blade body forms a hole extending through the blade body between the leading edge and the trailing edge. The blade body includes a pressure side wall and a suction side wall. The pressure side wall forms a portion of the pressure side surface and the hole. The pressure side wall has a first wall thickness extending between and to the pressure side surface and the hole. The suction side wall forms a portion of the suction side surface and the hole. The suction side wall has a second wall thickness extending between and to the suction side surface and the hole. The second wall thickness is different than the first wall thickness.

In any of the aspects or embodiments described above and herein, the first thickness may be greater than the second thickness.

In any of the aspects or embodiments described above and herein, the second thickness may be greater than the first thickness.

In any of the aspects or embodiments described above and herein, the first wall thickness and the second wall thickness may be disposed at a target fracture plane for the test rotor blade.

In any of the aspects or embodiments described above and herein, the blade body may further form a leading-edge pocket at the leading edge and a trailing-edge pocket at the trailing edge. The hole may extend through the blade body from the leading-edge pocket to the trailing edge pocket.

According to another aspect of the present disclosure, a test rotor blade for an aircraft engine bladed rotor includes a blade body. The blade body extends between and to a base end and a tip end. The blade body extends between and to a leading edge and a trailing edge. The blade body forms a first side surface and a second side surface. Each of the first side surface and the second side surface extend from the leading edge to the trailing edge. The blade body forms a leading-edge pocket at the leading edge, a trailing-edge pocket at the trailing edge, and a hole extending through the blade body from the leading-edge pocket to the trailing edge pocket. The hole includes a first end, a second end, and a hole length from the first end to the second end. The first end is disposed at the leading-edge pocket. The second end is disposed at the trailing-edge pocket. The blade body includes a first side wall and a second side wall. The first side wall has a first wall thickness extending between and to the first side surface and the hole. The second side wall has a second wall thickness extending between and to the second side surface and the hole. The first wall thickness is greater than the second wall thickness for all of the hole length of the hole.

In any of the aspects or embodiments described above and herein, the first side surface may be a pressure side surface of the blade body and the second side surface may be a suction side surface of the blade body.

In any of the aspects or embodiments described above and herein, the first side surface may be a suction side surface of the blade body and the second side surface may be a pressure side surface of the blade body.

In any of the aspects or embodiments described above and herein, the blade body may form a groove on the second side surface at a location of the second wall thickness.

In any of the aspects or embodiments described above and herein, the groove may extend along the blade body at the location of the second wall thickness for all of the hole length.

The present disclosure, and all its aspects, embodiments and advantages associated therewith will become more readily apparent in view of the detailed description provided below, including the accompanying drawings.

BRIEF DESCRIPTION OF THE DRAWINGS

FIGS. 5A-E illustrate cutaway views of different hole configurations for a test rotor blade, in accordance with one or more embodiments of the present disclosure.

FIGS. 6A-B illustrate sectional views of different side wall configurations for a test rotor blade, in accordance with one or more embodiments of the present disclosure.

FIG. 7 illustrates a sectional view of another side wall configuration for a test rotor blade, in accordance with one or more embodiments of the present disclosure.

DETAILED DESCRIPTION

Figure 1:
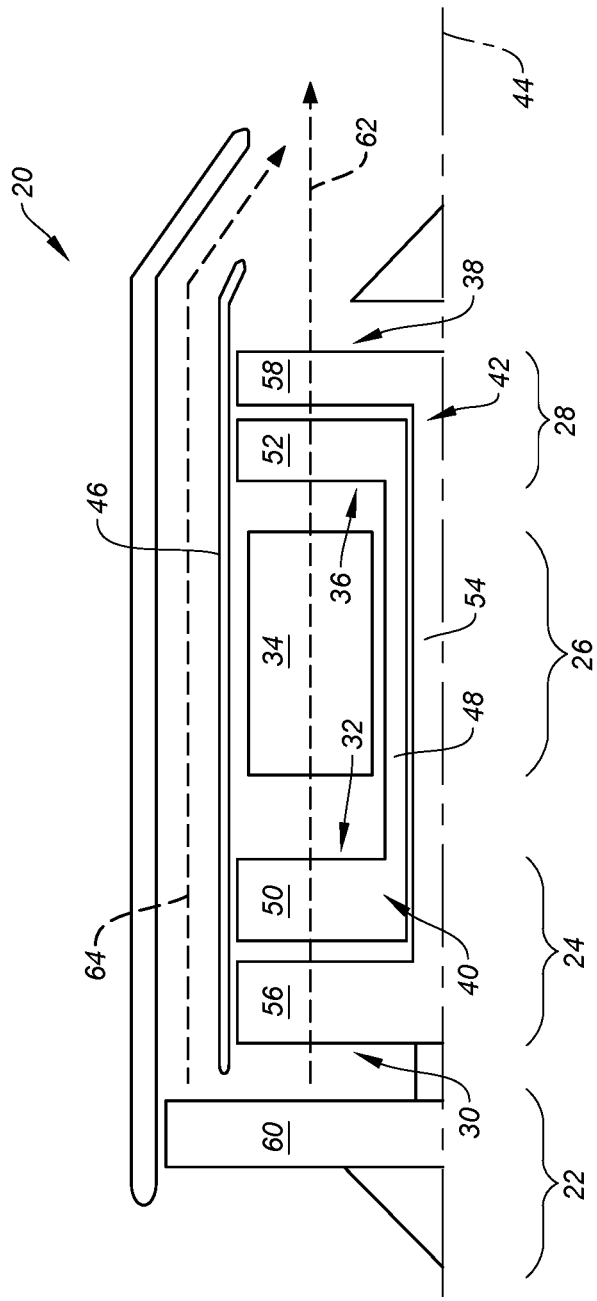
FIG. 1 schematically illustrates a cutaway, side view of a gas turbine engine for an aircraft propulsion system, in accordance with one or more embodiments of the present disclosure.

FIG. 1 schematically illustrates a gas turbine engine 20. The gas turbine engine 20 of FIG. 1 is a multi-spool turbofan gas turbine engine for an aircraft propulsion system. However, while the following description and accompanying drawings may refer to the turbofan gas turbine engine 20 of FIG. 1 as an example, it should be understood that aspects of the present disclosure may be equally applicable to other types of gas turbine engines including, but not limited to, a turboshaft gas turbine engine, a turboprop gas turbine engine, a turbojet gas turbine engine, a propfan gas turbine engine, or an open rotor gas turbine engine. Moreover, the present disclosure may also be equally applicable to rotational equipment other than gas turbine engines.

The gas turbine engine 20 of FIG. 1 includes a fan section 22, a compressor section 24, a combustor section 26, and a turbine section 28. For example, the compressor section 24 of FIG. 1 includes a low-pressure compressor (LPC) 30 and a high-pressure compressor (HPC) 32, the combustor section 16 includes a combustor 34 (e.g., an annular combustor), and the turbine section 28 includes a high-pressure turbine (HPT) 36 and a low-pressure turbine (LPT) 38.

The gas turbine engine 20 sections 22, 24, 28 form a first rotational assembly 40 (e.g., a high-pressure spool) and a second rotational assembly 42 (e.g., a low-pressure spool) of the gas turbine engine 20. The first rotational assembly 40 and the second rotational assembly 42 are mounted for rotation about a rotational axis 44 (e.g., an axial centerline of the gas turbine engine 20) relative to the engine static structure 46 of the gas turbine engine 20. The engine static structure 46 may include one or more engine cases, cowlings, bearing assemblies, and/or other non-rotating structures configured to house and/or support components of the gas turbine engine 20 sections 22, 24, 26, 28.

The first rotational assembly 40 includes a first shaft 48, a bladed first compressor rotor 50 for the high-pressure compressor 32, and a bladed first turbine rotor 52 for the high-pressure turbine 36. The first shaft 48 interconnects the bladed first compressor rotor 50 and the bladed first turbine rotor 52.

The second rotational assembly 42 includes a second shaft 54, a bladed second compressor rotor 56 for the low-pressure compressor 30, and a bladed second turbine rotor 58 for the low-pressure turbine 38. The second shaft 54 interconnects the bladed second compressor rotor 56 and the bladed second turbine rotor 58. The second shaft 54 of FIG. 1 additionally interconnects the bladed second compressor rotor 56 and the bladed second turbine rotor 58 with a bladed fan rotor 60 for the fan section 22. The second shaft 54 may alternatively be coupled to the bladed fan rotor 60 (e.g., an input shaft of the bladed fan rotor 60) by a reduction gear assembly configured to drive the bladed fan rotor 60 at a reduced rotational speed relative to the second shaft 54.

In operation of the gas turbine engine 20 of FIG. 1, ambient air is directed through the fan section 22 and into a core flow path 62 and a bypass flow path 64 by rotation of the bladed fan rotor 60. Airflow along the core flow path 62 is compressed by the low-pressure compressor 30 and the high-pressure compressor 32, mixed and burned with fuel in the combustor 34, and then directed through the high-pressure turbine 36 and the low-pressure turbine 38. The bladed first turbine rotor 52 and the bladed second turbine rotor 58 rotationally drive the first rotational assembly 40 and the second rotational assembly 42, respectively, in response to the combustion gas flow through the high-pressure turbine 36 and the low-pressure turbine 38. The first shaft 48 and the second shaft 54 are concentric and rotate about the rotational axis 44. The present disclosure, however, is not limited to concentric configurations of the first shaft 48 and the second shaft 54 and the first shaft 48 and the second shaft 54 may alternatively be configured for rotation about discrete rotational axes.

Figure 2:
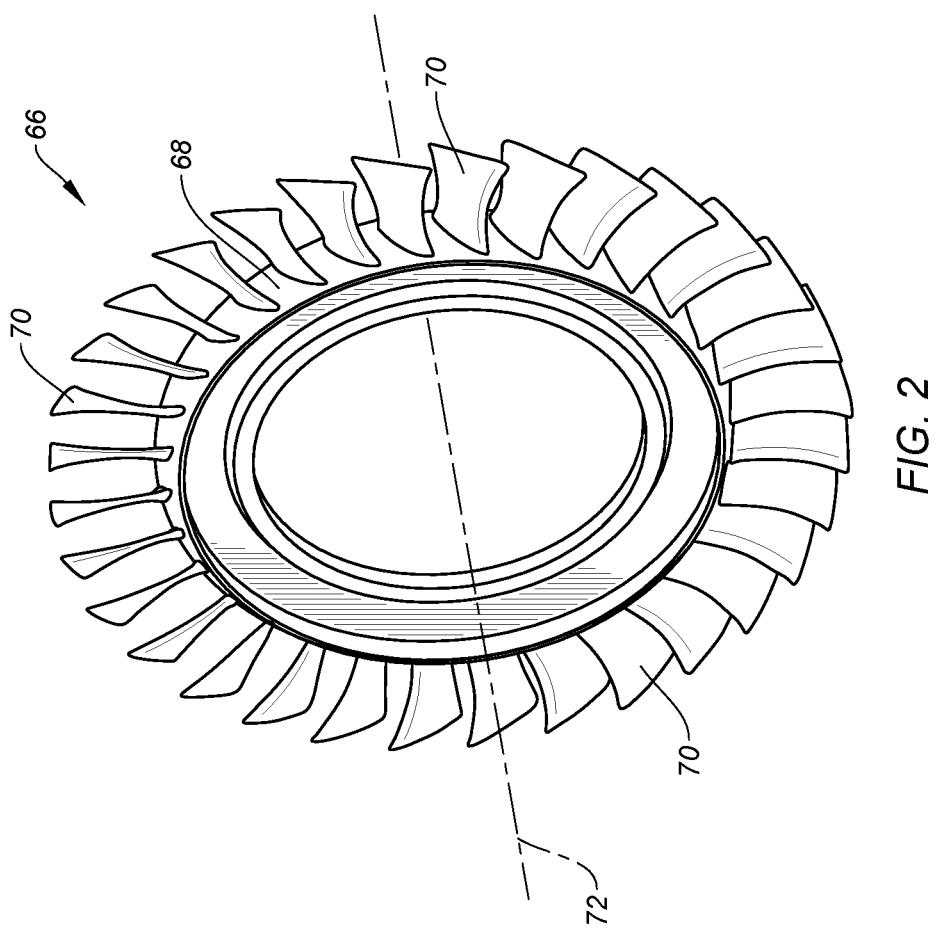
FIG. 2 illustrates perspective view of a bladed rotor for a gas turbine engine, in accordance with one or more embodiments of the present disclosure.

FIG. 2 illustrates a perspective view of an exemplary configuration of a bladed rotor 66. In particular, the bladed rotor 66 of FIG. 2 may be configured for use with the low-pressure compressor 30 (e.g., the bladed second compressor rotor 56) and/or the high-pressure compressor 32 (e.g., the bladed first compressor rotor 50) of the gas turbine engine 20 of FIG. 1. The present disclosure, however, is not limited to compressor rotor configurations and the bladed rotor 66 may be a bladed turbine rotor, a bladed fan rotor, or any other bladed rotor configuration. The bladed rotor 66 of FIG. 2 includes a disk 68 and a plurality of blades 70. The disk 68 extends circumferentially about (e.g., completely around) an axial centerline 72 (e.g., a rotational axis). The plurality of blades 70 are circumferentially distributed about the disk 68. The plurality of blades 70 are mounted to the disk 68 (e.g., to a radial periphery of the disk 68). Each of the plurality of blades 70 may be positioned within an axially extending slot (e.g., a dovetail slot) formed by the disk 68. Alternatively, the plurality of blades 70 may be formed with the disk 68 as a unitary component (e.g., the bladed rotor 66 may be configured as an integrated blade rotor (IBR) or "blisk"). The present disclosure, however, is not limited to any particular arrangement or mounting configuration of the plurality of blades 70 on the disk 68.

Figure 3:
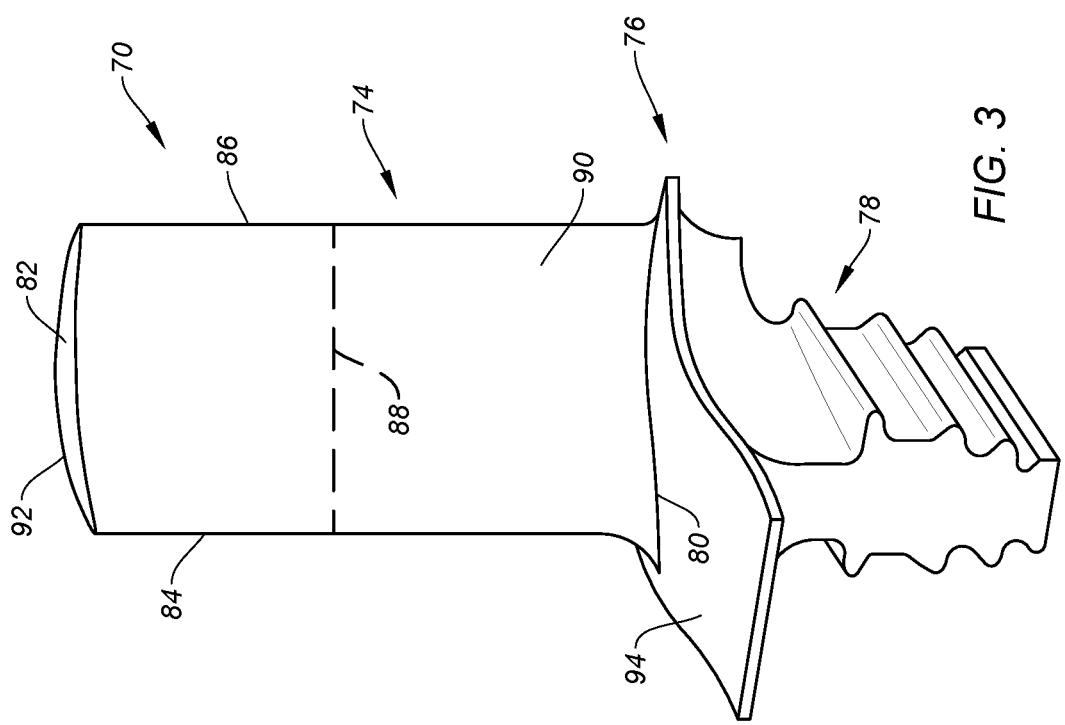
FIG. 3 illustrates a perspective view of a rotor blade for a bladed rotor, in accordance with one or more embodiments of the present disclosure.

FIG. 3 illustrates a perspective view of an exemplary configuration for one of the blades 70. The blade 70 of FIG. 3 includes a blade body 74, a platform 76, and a root 78.

The blade body 74 extends between and to a base end 80 of the blade body 74 and a tip end 82 of the blade body 74. The base end 80 is mounted to or otherwise disposed at (e.g., on, adjacent, or proximate) the platform 76. The tip end 82 is an outer radial end of the blade 70 relative to the axial centerline 72 (see FIG. 2). The blade body 74 extends between and to a leading edge 84 of the blade body 74 and a trailing edge 86 of the blade body 74. The leading edge 84 and the trailing edge 86 extend between and to the base end 80 and the tip end 82. The blade body 74 has a chord line 88 extending through the leading edge 84 and the trailing edge 86. The blade body 74 includes a pressure side surface 90 and a suction side surface 92. The pressure side surface 90 is disposed opposite (e.g., circumferentially opposite) the blade body 74 from the suction side surface 92. The pressure side surface 90 and the suction side surface 92 may extend between and to the base end 80 and the tip end 82. The pressure side surface 90 and the suction side surface 92 extend between and to the leading edge 84 and the trailing edge 86. The platform 76 may form a portion of an inner radial airflow surface 94 through the compressor section 24 (see FIG. 1). The root 78 is disposed radially inward of the platform 76. The root 78 is configured for mounting the blade 70 of FIG. 3 to a rotor disk, such as the disk 68 of FIG. 2.

Certification of an aircraft engine, such as the gas turbine engine 20, may include the performance of a "blade-off" test to demonstrate the capability of the aircraft engine for rotor blade containment and for subsequent rotation with bladed rotor imbalance (e.g., during an engine shutdown following the blade-off condition). In general, a blade-off test includes the intentional separation of a large portion (e.g., greater than 80 percent) of a test rotor blade (e.g., a compressor rotor blade) during operation of the aircraft engine. The performance of a blade-off test for an aircraft engine poses design challenges as there are strict requirements on the speed and kinetic energy that the separable portion of the test rotor blade must be released with during the intentional separation. Therefore, the test rotor blade should be designed such that the test rotor blade does not release the separable portion prematurely before reaching the target bladed rotor rotational speed and does release the separable portion at the target bladed rotor rotational speed.

Figure 4:
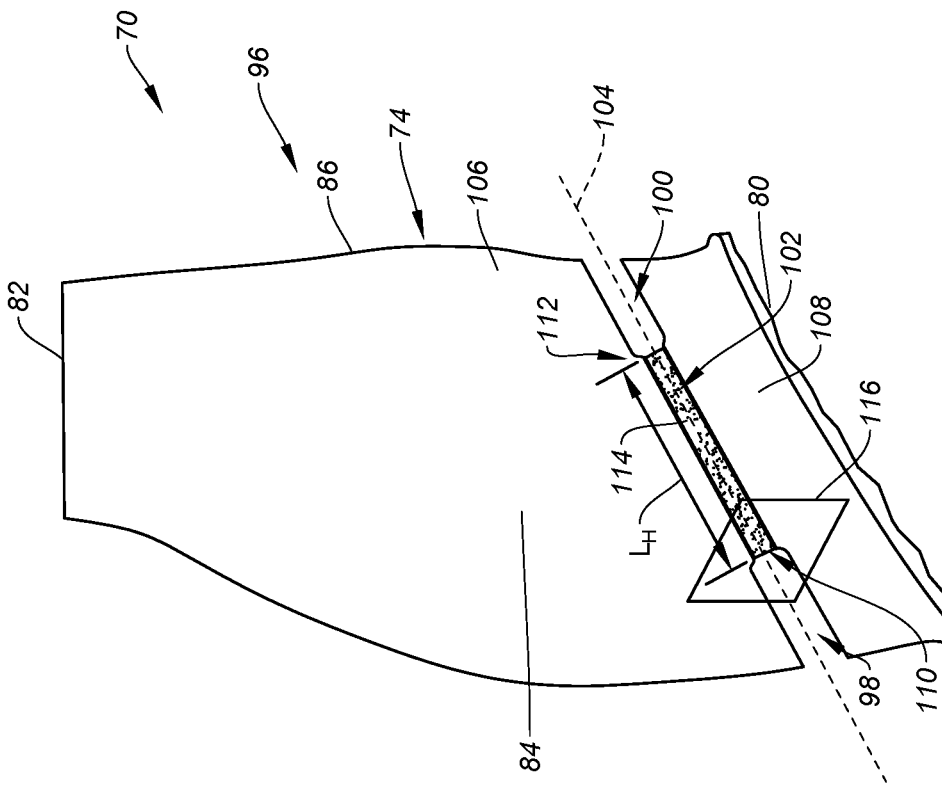
FIG. 4 illustrates a cutaway view of a test rotor blade for use on a bladed rotor during a blade-off test, in accordance with one or more embodiments of the present disclosure.

FIG. 4 illustrates a cutaway view of a test rotor blade 96 of the rotor blades 70 for use in the performance of an aircraft engine blade-off test. The blade body 74 of the test rotor blade 96 forms a leading-edge pocket 98, a trailing-edge pocket 100, and a hole 102. The leading-edge pocket 98, the trailing-edge pocket 100, and the hole 102 are oriented along a target fracture plane 104 for the test rotor blade 96. The target fracture plane 104 represents an intended location of separation of an outer radial portion 106 of the test rotor blade 96 (e.g., the blade body 74) from an inner radial portion 108 of the test rotor blade 96 (e.g., the blade body 74) at a particular radial height of the test rotor blade 96 during a blade-off test. The leading-edge pocket 98 is disposed at (e.g., on, adjacent, or proximate) the leading edge 84. The trailing-edge pocket 100 is disposed at (e.g., on, adjacent, or proximate) the trailing edge 86.

The hole 102 may extend through the blade body 74 between and to the leading-edge pocket 98 and the trailing-edge pocket 100. In particular, the hole 102 of FIG. 4 extends between and to a first end 110 of the hole 102 at the leading-edge pocket 98 and a second end 112 of the hole 102 at the trailing-edge pocket 100. The hole 102 has a length $L_H$ extending from the first end 110 to the second end 112. The hole 102 may have a diameter which is less than respective diameters, widths, heights, etc. of the leading-edge pocket 98 and/or the trailing-edge pocket 100. The leading-edge pocket 98 and the trailing-edge pocket 100 may be formed by slots, holes, or other apertures at the leading edge 84 and the trailing edge 86, respectively. The leading-edge pocket 98 and the trailing-edge pocket 100 may be formed through the pressure side surface 90 and the suction side surface 92 at (e.g., on, adjacent, or proximate) the leading edge 84 and the trailing edge 86, respectively. Referring briefly to FIGS. 5A-E, the hole 102 may be formed through the blade body 74 with a variety of different shapes, orientations, and configurations. For example, as shown in FIG. 5A, the hole 102 may extend linearly or substantially linearly from the first end 110 to the second end 112, for example, along the chord line 88 (see FIG. 4). As shown in FIG. 5B, the hole 102 may alternatively include a curvature along all or a portion of the length $L_H$ from the first end 110 to the second end 112 (see FIG. 4). For example, the hole 102 may have a curvature matching a curvature of the pressure side surface 90 or the suction side surface 92. As shown in FIG. 5C, the hole 102 may alternatively include a plurality of linear or substantially linear segments. For example, each linear segment may have an axial centerline different than one or more other linear segment Additionally or alternatively, a linear segment may have a diameter which is different than a diameter of one or more other linear segments. For example, a first linear segment of the hole 102 may be formed (e.g., drilled) from the leading-edge pocket 98 to a mid-chord position of the blade body 74 and a second linear segment of the hole 102 may be formed (e.g., drilled) from the trailing-edge pocket 100 to intersect the first linear segment at the mid-chord position. As shown in FIGS. 5D and 5E, the hole 102 may include an enlarged-diameter hole portion, which enlarged-diameter hole portion may be a diameter that is greater than in adjacent portions of the hole 102. For example, the hole 102 may include the enlarged-diameter hole portion at one or both of the leading-edge pocket 98 and the trailing edge pocket 100. As shown in FIGS. 5D and 5E, the enlarged-diameter hole portions may form linear segments of the hole 102 while smaller-diameter adjacent portions of the hole 102 may be curved. The present disclosure, however, is not limited to the foregoing exemplary configurations of the hole 102.

To prepare the test rotor blade 96 for an aircraft engine blade-off test, a thermal charge 114 is deposited within the hole 102. The thermal charge 114 may additionally be deposited within portions of the leading-edge pocket 98 and/or the trailing-edge pocket 100. The thermal charge 114 may preferably include a thermite material. The thermite material is configured to be ignited (e.g., by an igniter installed in the test rotor blade 96) and to undergo an exothermic reduction-oxidation reaction, briefly exposing the material (e.g., titanium) of the blade body 74 at (e.g., on, adjacent, or proximate) the hole 102 to high-temperature conditions, thereby reducing the tensile properties of the blade body 74 material to effect separation of the test rotor blade 96 at a target bladed rotor rotational speed. The thermal charge 114 may alternatively include an explosive material (e.g., cyclotrimethylene trinitramine (RDX)) or another suitable ignitable material configured to effect separation of the test rotor blade 96 at the target fracture plane 104 by heating, penetrating, weakening, melting, or otherwise degrading the material of the blade body 74 at (e.g., on, adjacent, or proximate) the hole 102. The leading-edge pocket 98 and/or the trailing-edge pocket 100 may accommodate a plug and/or an igniter for the thermal charge 114.

FIGS. 6A and 6B illustrate different exemplary positions of the hole 102 relative to the pressure side surface 90 and the suction side surface 92. FIGS. 6A and 6B illustrate sectional views of the test rotor blade 96 at the first end 110 along the plane 116 of FIG. 4. The test rotor blade 96 (e.g., the blade body 74) includes a pressure side wall 118 and a suction side wall 120. The pressure side wall 118 extends between and to the hole 102 and the pressure side surface 90 and, thereby, forms portions of the pressure side surface 90 and the hole 102. The pressure side wall 118 has a thickness $T_P$ extending from the pressure side surface 90 to the hole 102. The thickness $T_P$ is a minimum distance between the pressure side surface 90 and the hole 102 at a given point along the length $L_H$ of the hole 102 (see FIG. 4). Similarly, the suction side wall 120 extends between and to the hole 102 and the suction side surface 92 and, thereby, forms portions of the suction side surface 92 and the hole 102. The suction side wall 120 has a thickness $T_S$ extending from the suction side surface 92 to the hole 102. The thickness $T_S$ is a minimum distance between the suction side surface 92 and the hole 102 at a given point along the length $L_H$ of the hole 102.

As can be understood from FIGS. 6A and 6B, the thickness $T_P$ is different than the thickness $T_S$. As will be discussed in further detail, the present disclosure configuration of the thickness $T_P$ relative to the thickness $T_S$ facilitates improved reliability of the test rotor blade 96 for blade-off tests by increasing the likelihood of successful test rotor blade 96 separation at the target bladed rotor rotational speed, compared to at least some conventional rotor blades configured for blade-off tests. For example, where side wall thicknesses (e.g., thickness $T_P$ and thickness $T_S$) of a test rotor blade may be equal, the centrifugal forces from bladed rotor rotation and the resulting stresses experienced by the walls on at (e.g., on, adjacent, or proximate) the fracture plane (e.g., during thermal charge ignition) may be the same or substantially the same for each of the side walls. However, the temperatures generated by ignition of the thermal charge may not sufficiently reduce the tensile capability of the test rotor blade body material to allow the test rotor blade to separate at the target bladed rotor rotational speed. The present disclosure configuration of the thickness $T_P$ relative to the thickness $T_S$ may additionally facilitate a reduction in the likelihood of premature test rotor blade 96 separation. The hole 102 of FIGS. 6A and 6B is illustrated with a substantially circular cross-sectional shape, however, it should be understood that the present disclosure is not limited to any particular cross-sectional shape for the hole 102.

Referring to FIG. 6A, the thickness $T_S$ of the suction side wall 120 is less than the thickness $T_P$ of the pressure side wall 118. Where the suction side wall 120 is thinner than the pressure side wall 118, the following inequality [1] may be satisfied:

$$0.4 \le \frac{T_S}{T_P} \le 0.9$$

In other words, the thickness $T_S$ may be within a thickness range of $0.4T_P$ to $0.9T_P$. The thickness $T_S$ may be within the $0.4T_P$ to $0.9T_P$ thickness range along all or a substantial portion of the length $L_H$ of the hole 102 (see FIG. 4). Additionally or alternatively, an average of the thickness $T_S$ along the entire length $L_H$ of the hole 102 may be within the $0.4T_P$ to $0.9T_P$ thickness range. With the thickness $T_S$ less than $0.4T_P$, there is a significantly increased likelihood of a premature failure of the suction side wall 120 and, and a result, a premature separation of the test rotor blade 96 prior to reaching the target bladed rotor rotational speed. However, in some other cases where the thickness $T_S$ less than $0.4T_P$, the relatively thicker pressure side wall 118 may resist fracturing at the target bladed rotor rotational speed, thereby increasing the likelihood of a failure of the test rotor blade 96 to separate at the target bladed rotor rotational speed. With the thickness $T_S$ greater than $0.9T_P$, the likelihood of a failure of the test rotor blade 96 to separate at the target bladed rotor rotational speed may be increased, for example, due to the relatively close values of the thickness $T_S$ and the thickness $T_P$.

Referring to FIG. 6B, the thickness $T_P$ of the pressure side wall 118 is less than the thickness $T_S$ of the suction side wall 120. Where the pressure side wall 118 is thinner than the suction side wall 120, the following inequality [2] may be satisfied:

$$0.4 \le \frac{T_P}{T_S} \le 0.9$$

In other words, the thickness $T_P$ may be within a thickness range of $0.4 T_S$ to $0.9 T_S$. The thickness $T_P$ may be within the $0.4 T_S$ to $0.9 T_S$ thickness range along all or a substantial portion of the length $L_H$ of the hole 102 (see FIG. 4). Additionally or alternatively, an average of the thickness $T_P$ along the entire length $L_H$ of the hole 102 may be within the $0.4 T_S$ to $0.9 T_S$ thickness range. With the thickness $T_P$ less than $0.4 T_S$, there is a significantly increased likelihood of a premature failure of the pressure side wall 118 and, and a result, a premature separation of the test rotor blade 96 prior to reaching the target bladed rotor rotational speed. However, in some other cases where the thickness $T_P$ less than $0.4 T_S$, the relatively thicker suction side wall 120 may resist fracturing at the target bladed rotor rotational speed, thereby increasing the likelihood of a failure of the test rotor blade 96 to separate at the target bladed rotor rotational speed. With the thickness $T_P$ greater than $0.9 T_S$, the likelihood of a failure of the test rotor blade 96 to separate at the target bladed rotor rotational speed may be increased, for example, due to the relatively close values of the thickness $T_S$ and the thickness $T_P$.

Referring to FIG. 7, in some embodiments, the pressure side wall 118 and/or the suction side wall 120 may be locally shaped to control the relative thicknesses $T_P$, $T_S$ (e.g., to establish the aforementioned thickness ranges along the hole 102). For example, the pressure side wall 118 (e.g., the pressure side surface 90) and/or the suction side wall 120 (e.g., the suction side surface 92) may be machined, etched, milled, cut, abraded, or otherwise formed at a location of the thickness $T_P$ and/or the thickness $T_S$. The test rotor blade 96 of FIG. 7, for example, includes a groove 122 formed by the suction side wall 120 on the suction side surface 92 at (e.g., on, adjacent, or proximate) the location of the thickness $T_S$. The groove 122 of FIG. 7 has a depth $D_G$ relative to the surrounding portions of the suction side surface 92 outside the groove 122. The depth $D_G$ may be constant or substantially constant along the length $L_H$ of the hole 102 (see FIG. 4). Alternatively, the depth $D_G$ may vary along the length $L_H$ of the hole 102, for example, to account for localized variations in the shape of the test rotor blade 96. Of course, the present disclosure is not limited to the particular shape or positioning of the groove 122 of FIG. 7. While the groove 122 of FIG. 7 is illustrated on the side wall (e.g., the suction side wall 120) having thinner wall thickness (e.g., relative to the pressure side wall 118), the groove 122 may additionally or alternatively be disposed on the side wall having the thicker wall thickness.

Referring again to FIGS. 6A and 6B, in operation, as the bladed rotor 66 (see FIG. 2) is rotating in preparation for a blade-off test, the thicker side wall (e.g., one of the pressure side wall 118 or the suction side wall 120) carries a significantly larger proportion of the centrifugal load experienced by the outer radial portion 106, thereby alleviating the centrifugal load carried by the thinner side wall (e.g., the other of the pressure side wall 118 or the suction side wall 120). Accordingly, the thicker side wall may carry enough of the centrifugal load such that there is minimal risk of premature separation of the outer radial portion 106. When igniting the thermal charge 114 (see FIG. 4) at the initiation of the blade-off test, the thinner side wall experiences a significantly greater temperature increase relative to the thicker side wall. Additionally, for example, the thinner side wall experiences a significantly greater temperature increase relative to alternative test rotor blade configurations having side wall thicknesses which are substantially the same. Due to the temperature increase, the tensile capabilities of the thinner side wall will fall below the applied stress level, resulting in fracturing of the thinner side wall along the target fracture plane 104 (see FIG. 4). Once the thinner side wall fractures, the stresses experienced by the thicker side wall significantly increase due to a reduction in the test rotor blade 96 material along the target fracture plane 104 as well as the additional bending loads applied to the test rotor blade 96 at the thicker side wall, thereby facilitating fracture of the thicker side wall and separation of the outer radial portion 106 at the target bladed rotor rotational speed.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts, and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. A test rotor blade for an aircraft engine bladed rotor, the test rotor blade comprising:
 a blade body, the blade body extends between and to a base end and a tip end, the blade body extends between and to a leading edge and a trailing edge, the blade body forms a first side surface and a second side surface, each of the first side surface and the second side surface extend from the leading edge to the trailing edge, the blade body forms:
  a leading-edge pocket at the leading edge;
  a trailing-edge pocket at the trailing edge; and
  a hole extending through the blade body from the leading-edge pocket to the trailing edge pocket, the hole includes a first linear segment extending from a first end, a second linear segment extending from a second end, and a hole length from the first end to the second end, the first end is disposed at the leading-edge pocket, and the second end is disposed at the trailing-edge pocket;
 the blade body includes a first side wall and a second side wall, the first side wall has a first wall thickness extending between and to the first side surface and the hole, the second side wall has a second wall thickness extending between and to the second side surface and the hole, and the second wall thickness is 0.4 to 0.9 times the first wall thickness.

2. The test rotor blade of claim 1, wherein the first side surface is a pressure side surface of the blade body and the second side surface is a suction side surface of the blade body.

3. The test rotor blade of claim 1, wherein the first side surface is a suction side surface of the blade body and the second side surface is a pressure side surface of the blade body.

4. The test rotor blade of claim 1, wherein the second wall thickness is 0.4 to 0.9 times the first wall thickness for all of the hole length of the hole.

5. The test rotor blade of claim 1, wherein the first wall thickness is a first average wall thickness extending between and to the first side surface and the hole along the hole length and the second wall thickness is a second average wall thickness extending between and to the second side surface and the hole along the hole length.

6. The test rotor blade of claim 1, wherein the blade body forms a groove on the second side surface at a location of the second wall thickness.

7. The test rotor blade of claim 1, further comprising a thermite thermal charge disposed within the hole.

8. The test rotor blade of claim 1, wherein the first linear segment and the second linear segment intersect at a mid-chord position of the blade body.

9. A gas turbine engine for an aircraft propulsion system, the gas turbine engine comprising:
 a compressor including a bladed compressor rotor, the bladed compressor rotor includes a plurality of rotor blades, the plurality of rotor blades includes a test rotor blade, the test rotor blade includes:
  a blade body, the blade body extends between and to a base end and a tip end, the blade body extends between and to a leading edge and a trailing edge, the blade body forms a pressure side surface and a suction side surface, each of the pressure side surface and the suction side surface extends from the leading edge to the trailing edge, the blade body forms a hole extending through the blade body between the leading edge and the trailing edge, the blade body includes a pressure side wall and a suction side wall, the pressure side wall forms a portion of the pressure side surface and the hole, the pressure side wall has a first wall thickness extending between and to the pressure side surface and the hole, the suction side wall forms a portion of the suction side surface and the hole, the suction side wall has a second wall thickness extending between and to the suction side surface and the hole, and the second wall thickness is different than the first wall thickness,
 wherein the blade body further forms a leading-edge pocket at the leading edge and a trailing-edge pocket at the trailing edge, and
 the hole extends through the blade body from the leading-edge pocket to the trailing edge pocket, and the hole forms a first linear segment and a second linear segment, the first linear segment and the second linear segment intersecting at a mid-chord position of the blade body.

10. The gas turbine engine of claim 9, wherein the first thickness is greater than the second thickness.

11. The gas turbine engine of claim 9, wherein the second thickness is greater than the first thickness.

12. The gas turbine engine of claim 9, wherein the first wall thickness and the second wall thickness are disposed at a target fracture plane for the test rotor blade.

13. The gas turbine engine of claim 9, wherein the blade body forms a groove on the suction side surface at a location of the second wall thickness.

14. A test rotor blade for an aircraft engine bladed rotor, the test rotor blade comprising:
 a blade body, the blade body extends between and to a base end and a tip end, the blade body extends between and to a leading edge and a trailing edge, the blade body forms a first side surface and a second side surface, each of the first side surface and the second side surface extend from the leading edge to the trailing edge, the blade body forms:
  a leading-edge pocket at the leading edge;
  a trailing-edge pocket at the trailing edge; and
  a hole extending through the blade body from the leading-edge pocket to the trailing edge pocket, the hole includes a first end, a second end, and a hole length from the first end to the second end, the first end is disposed at the leading-edge pocket, and the second end is disposed at the trailing-edge pocket, the hole forms a plurality of linear segments between the first end and the second end, the plurality of linear segments includes a first linear segment and a second linear segment, the first linear segment and the second linear segment intersect at a mid-chord position of the blade body;
 the blade body includes a first side wall and a second side wall, the first side wall has a first wall thickness extending between and to the first side surface and the hole, the second side wall has a second wall thickness extending between and to the second side surface and the hole, and the first wall thickness is greater than the second wall thickness for all of the hole length of the hole.

15. The test rotor blade of claim 14, wherein the first side surface is a pressure side surface of the blade body and the second side surface is a suction side surface of the blade body.

16. The test rotor blade of claim 14, wherein the first side surface is a suction side surface of the blade body and the second side surface is a pressure side surface of the blade body.

17. The test rotor blade of claim 14, wherein the blade body forms a groove on the second side surface at a location of the second wall thickness.

18. The test rotor blade of claim 17, wherein the groove extends along the blade body at the location of the second wall thickness for all of the hole length.

* * * * *